(12) United States Patent
Nakano et al.

(10) Patent No.: US 7,364,165 B2
(45) Date of Patent: Apr. 29, 2008

(54) SHAFT SEAL MECHANISM

(75) Inventors: Takashi Nakano, Takasago (JP);
Hirokazu Shirai, Takasago (JP); Toshio Asada, Takasago (JP); Shin Nishimoto, Takasago (JP); Tanehiro Shinohara, Takasago (JP); Hidekazu Uehara, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 334 days.

(21) Appl. No.: 10/849,023

(22) Filed: May 20, 2004

(65) Prior Publication Data

US 2004/0256810 A1    Dec. 23, 2004

(30) Foreign Application Priority Data

May 21, 2003 (JP) ............................. 2003-143272

(51) Int. Cl.
*F01D 11/02* (2006.01)
(52) U.S. Cl. .................. 277/355; 277/412; 277/413
(58) Field of Classification Search ................ 277/355, 277/347, 412, 413, 421
See application file for complete search history.

(56) References Cited

U.S. PATENT DOCUMENTS

| 5,090,710 | A | | 2/1992 | Flower |
| 5,135,237 | A | | 8/1992 | Flower |
| 5,474,305 | A | * | 12/1995 | Flower ........................ 277/355 |
| 6,267,381 | B1 | | 7/2001 | Wright |
| 6,343,792 | B1 | * | 2/2002 | Shinohara et al. ........... 277/355 |
| 6,364,316 | B1 | * | 4/2002 | Arora ........................... 277/355 |
| 6,860,484 | B2 | * | 3/2005 | Urlichs ........................ 277/412 |
| 2001/0030397 | A1 | | 10/2001 | Beichl |
| 2002/0117807 | A1 | * | 8/2002 | Yoshida et al. .............. 277/412 |
| 2003/0042682 | A1 | | 3/2003 | Inoue |
| 2003/0062686 | A1 | | 4/2003 | Uehara et al. |
| 2003/0068224 | A1 | | 4/2003 | Uehara et al. |
| 2003/0071423 | A1 | * | 4/2003 | Urlichs ........................ 277/411 |

FOREIGN PATENT DOCUMENTS

| EP | 0293140 | A2 | 11/1988 |
| EP | 0933567 | A2 | 8/1999 |
| EP | 1288540 | A1 | 3/2003 |
| EP | 1298366 | A2 | 4/2003 |
| EP | 1302708 | A2 | 4/2003 |
| FR | 2650048 | | 1/1991 |
| JP | 410196801 | A * | 7/1998 |

(Continued)

OTHER PUBLICATIONS

H. Nakane et al., "The Development of High Performance Leaf Seals", Proceedings of ASME Turbo Expo 2002, Jun. 3-6, 2002, Amsterdam, Netherlands, pp. 1-9.

*Primary Examiner*—Vishal Patel
*Assistant Examiner*—Gilbert Lee
(74) *Attorney, Agent, or Firm*—Wenderoth, Lind & Ponack, L.L.P.

(57) ABSTRACT

A leaf seal as a shaft seal mechanism is made compact and enables reduction of manufacturing cost. Plural thin plates 29 lapped one on another in layers have their outer circumferential proximal ends fixed to each other by welding so that an annular thin plate assembly 29A having flexibility is formed. This thin plate assembly 29A is bent and assembled to form the leaf seal 25.

7 Claims, 6 Drawing Sheets

FOREIGN PATENT DOCUMENTS

| | | |
|---|---|---|
| JP | 2000-120878 | 4/2000 |
| JP | 2000-154875 | 6/2000 |
| JP | 2001-50396 | 2/2001 |
| JP | 2003-106458 | 4/2003 |
| WO | 00/03164 | 1/2000 |

* cited by examiner

SHAFT SEAL MECHANISM

BACKGROUND OF THE INVENTION

1. Field of the Invention

The present invention relates to a shaft seal mechanism appropriately used for a rotating shaft or the like of a large size fluid machine, such as a gas turbine, steam turbine, compressor, water turbine, refrigerator, pump or the like.

2. Description of the Prior Art

Generally, around a rotating shaft of a gas turbine, steam turbine or the like, a shaft seal mechanism is provided for reducing leakage of working fluid leaking to a lower pressure side from a higher pressure side. As one example of such a shaft seal mechanism, a leaf seal shown in the Japanese laid-open patent application 2002-13647, for example, is known.

Figure 6:
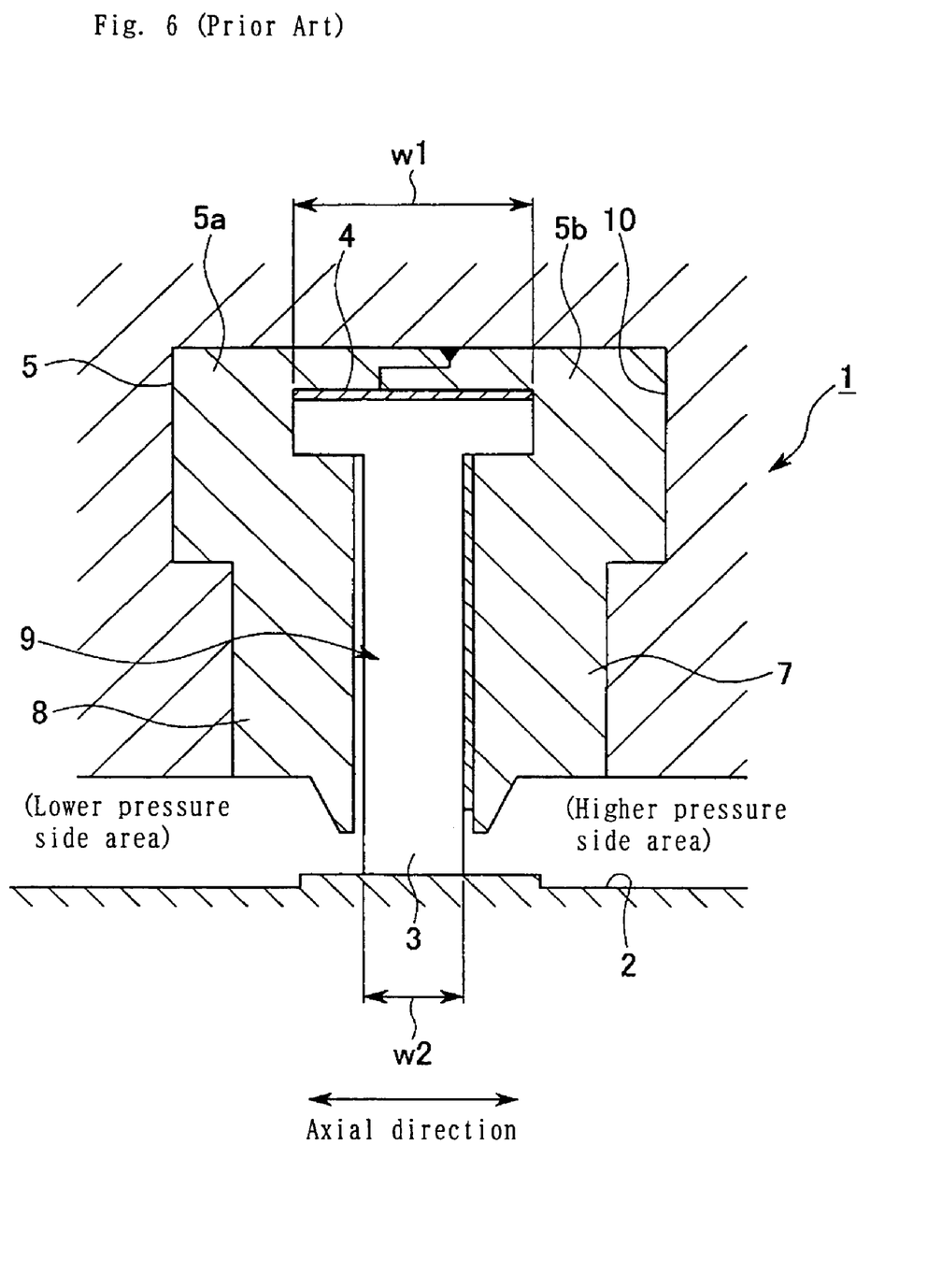
FIG. 6 is a cross sectional view showing a construction of one example of a prior art leaf seal (shaft seal mechanism), wherein this leaf seal is seen on a cross section including an axis of a rotating shaft.

FIG. 6 is a cross sectional view of one example of a prior art leaf seal (shaft seal mechanism) of the kind mentioned above, wherein this leaf seal is seen on a cross section including an axis of a rotating shaft. In FIG. 6, numeral 1 designates a leaf seal and numeral 2 a rotating shaft. The leaf seal 1 is constructed such that a plurality of thin plates 3 of a flat shape having a predetermined size of a plate width in an axial direction of the rotating shaft 2 are arranged in layers in which a minute gap is provided between each of the thin plates 3 in a circumferential direction of the rotating shaft 2 so that a thin plate assembly 9 of an annular shape is formed. These thin plates 3 have their outer circumferential proximal end side fixed to a split housing or leaf seal ring 5 (5a, 5b) via a brazed portion 4 and their inner circumferential distal end side arranged inclinedly with an acute angle relative to an outer circumferential surface of the rotating shaft 2 so as to make a slidable contact with the outer circumferential surface of the rotating shaft 2 by a pre-load. It is to be noted that, when seen on a plan view, each of the thin plates 3 has a T-shape in which the size of width w1 of the above-mentioned outer circumferential proximal end side is larger than the size of width w2 of the above-mentioned inner circumferential distal end side.

By the construction mentioned above, the thin plates 3 seal the outer circumferential surface of the rotating shaft 2 and thereby an annular space formed around the rotating shaft 2 is divided into a higher pressure side area and a lower pressure side area. Also, the leaf seal ring 5 comprises a higher pressure side side plate 7 on the side opposed to the higher pressure side area and a lower pressure side side plate 8 on the side opposed to the lower pressure side area so that the thin plates 3 are fitted in between the higher pressure side side plate 7 and the lower pressure side side plate 8. The respective side plates 7, 8 are arranged also to function as a guide plate for guiding a direction to which pressure acts.

In the leaf seal 1 constructed as mentioned above, when the rotating shaft 2 rotates, a dynamic pressure effect is caused by the rotation of the rotating shaft 2 and the distal end of each of the thin plates 3 is levitated from the outer circumferential surface of the rotating shaft 2 so that contact of the distal ends of the thin plates 3 with the rotating shaft 2 is avoided. Thereby, abrasion of the thin plates 3 is avoided and the seal life is elongated.

While the prior art leaf seal 1 is manufactured such that each of the thin plates 3 is fitted in between the two split housings 5a, 5b and the jointing portion between the housings 5a, 5b is fixed by welding or bolting, there are many kinds of rotor diameter sizes, different from each other, according to the places where the leaf seal is to be provided. Thus, in the manufacture of the housings 5a, 5b, it is necessary to individually prepare exclusive jigs according to the diameter sizes. As the leaf seal 1 is used in various places and the diameter sizes are mostly different from each other, to prepare such exclusive jigs is a large obstruction in reducing the manufacturing cost.

SUMMARY OF THE INVENTION

In view of the above-mentioned circumstances of the prior art, it is an object of the present invention to provide a means for enabling a reduction of manufacturing cost of a shaft seal mechanism and also contributing to compacting the shaft seal mechanism.

In order to achieve the above-mentioned object, the present invention provides the following means.

That is, a shaft seal mechanism according to a first aspect of the present invention is characterized in being constructed such that a plurality of thin plates are arranged in an annular space between a rotor and a stator so as to form a thin plate assembly of an annular shape. The thin plates have their outer circumferential proximal end side supported to the side of the stator and their inner circumferential distal end side non-fixed to an outer circumferential surface of the rotor so that the thin plate assembly of the annular shape divides the annular space between the rotor and the stator into a higher pressure side area and a lower pressure side area. The outer circumferential proximal end side of each of the thin plates is pinched to be retained between thin plate retaining rings, having a flexibility, of a pair.

According to the above shaft seal mechanism, a curvature thereof can be freely changed according to the curvature of the place where the shaft seal mechanism is to be provided. Hence, no exclusive jig as in the conventional case is needed to be individually prepared and this enables a reduction of the manufacturing cost of the shaft seal mechanism. Also, a thickness of each of the thin plate retaining rings is thinned to the extent to exhibit flexibility and thereby external sizes of these thin plate retaining rings can be made smaller. This contributes to making the entire shaft seal mechanism compact.

A shaft seal mechanism according to a second aspect of the invention is characterized in that, in the shaft seal mechanism mentioned above, the outer circumferential proximal end side of each of the thin plates is pinched to be retained between the thin plate retaining rings via a deviation preventing member that regulates motion of each of the thin plates relative to the thin plate retaining rings.

According to the shaft seal mechanism according to the second aspect of the invention, the deviation preventing member is provided, whereby deviation of each of the thin plates can be effectively prevented. That is, rattling of each of the thin plates relative to the thin plate retaining rings can be prevented.

A shaft seal mechanism according to a third aspect of the present invention is characterized in that, in the shaft seal mechanism mentioned discussed above, the thin plate assembly has its side edge in a rotor axial direction formed with a cut-off portion, there is provided a plate having its side surface formed with a stepped portion that is engageable with the cut-off portion, the plate is arranged, abutting on the thin plate assembly from the rotor axial direction, so that the stepped portion of the plate corresponds to the cut-off portion of the thin plate assembly and the thin plate assembly together with the plate is pinched to be retained between the thin plate retaining rings. Accordingly, fitting of the plate can be easily carried out.

A shaft seal mechanism according to a fourth aspect of the invention is characterized in being constructed such that a plurality of thin plates are arranged in an annular space between a rotor and a stator so as to form a thin plate assembly of an annular shape. The thin plates have their outer circumferential proximal end side supported to the side of the stator and their inner circumferential distal end side non-fixed to an outer circumferential surface of the rotor so that the thin plate assembly of the annular shape divides the annular space between the rotor and the stator into a higher pressure side area and a lower pressure side area. The thin plate assembly is made such that mutually adjacent ones of the outer circumferential proximal end sides of the thin plates, lapped one on another in layers, are welded to be fixed to each other, and the thin plate assembly of the thin plates so welded is bent along a circumferential plane of the annular space.

According to the shaft seal mechanism, a curvature thereof can be freely changed according to the curvature of the place where the shaft seal mechanism is to be provided.

DESCRIPTION OF THE PREFERRED EMBODIMENTS

One embodiment of a gas turbine comprising a leaf seal (shaft seal mechanism) according to the present invention will be described with reference to appended drawings, provided that, as a matter of course, the present invention is not to be construed as limited to the present embodiment. Also, while the present embodiment will be described with respect to an example where a large size fluid machine to which the present invention is applied is a turbine of a gas turbine, the present invention is also applicable to a rotating shaft or the like of a large size fluid machine, such as a steam turbine, compressor, water turbine, refrigerator, pump, aero gas turbine engine or the like.

Figure 1:
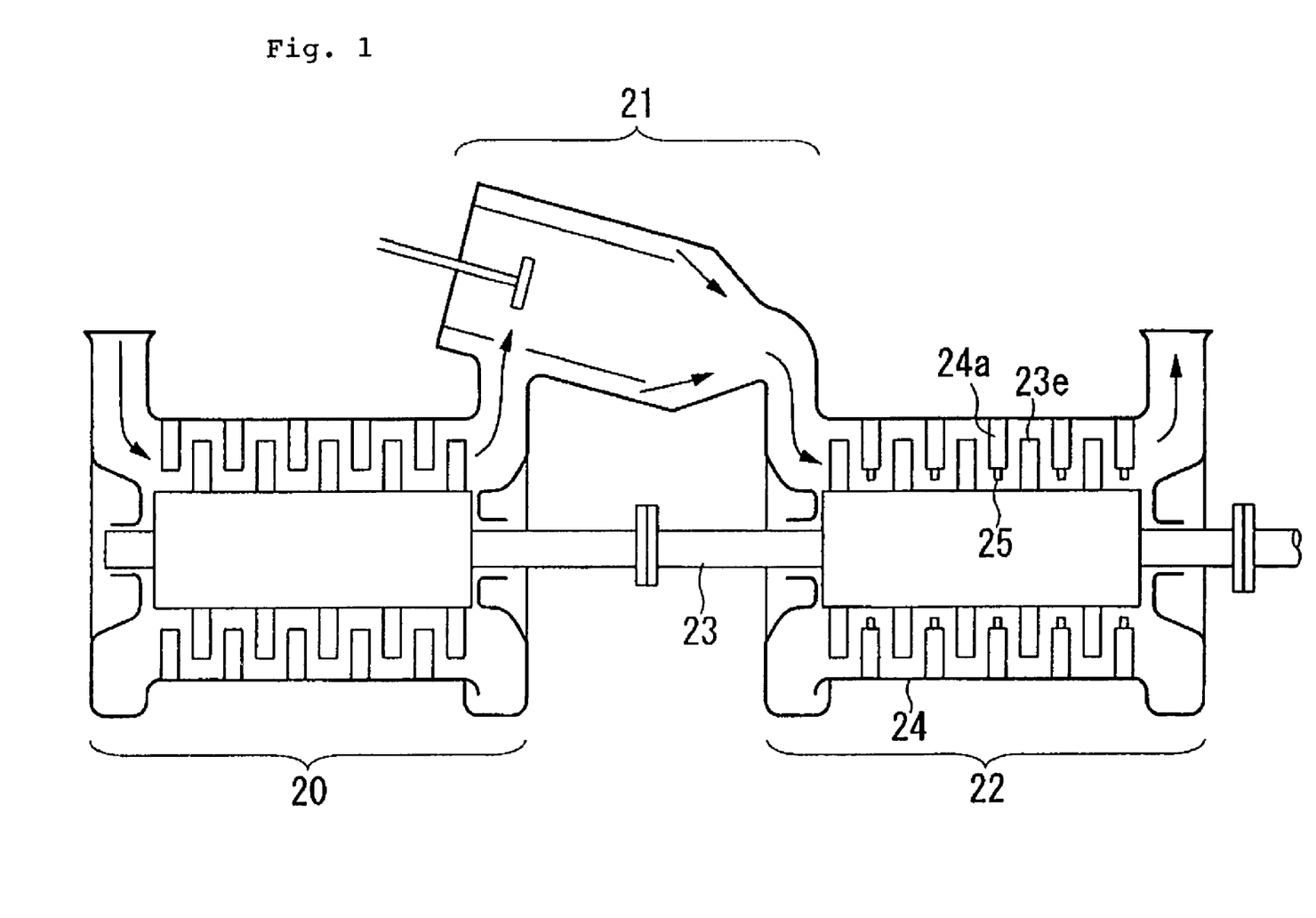
FIG. 1 is a schematic constructional cross sectional view showing an embodiment of a gas turbine comprising a leaf seal (shaft seal mechanism) according to the present invention.

FIG. 1 is a schematic constructional cross sectional view showing the embodiment of a gas turbine comprising a leaf seal (shaft seal mechanism) according to the present invention. In FIG. 1, numeral 20 designates a compressor, numeral 21 a combustor, numeral 22 a turbine and numeral 24 a stator. The compressor 20 takes thereinto a large quantity of air to be compressed. Generally, in a gas turbine, a portion of power obtained by a rotating shaft 23, as will be described below, is used as a drive force of the compressor. The combustor 21 functions to burn a mixture of fuel and the air compressed by the compressor 20. The turbine 22 introduces thereinto a combustion gas generated at the combustor 21 to be expanded so that the combustion gas so expanded is blown onto a plurality of rotor blades 23*e* fitted to the rotating shaft 23. Thereby thermal energy of the combustion gas is converted into a rotational energy so that a mechanical drive force is generated.

In the turbine 22, in addition to the plurality of rotor blades 23*e* arranged on the rotating shaft 23 side, a plurality of stator blades 24*a* are arranged on the stator 24 side, wherein the rotor blades 23*e* and the stator blades 24*a* are alternately provided in an axial direction of the rotating shaft 23. Each of the rotor blades 23*e* receives pressure of the combustion gas flowing in the axial direction of the rotating shaft 23 to thereby rotate the rotating shaft 23, so that the rotational energy given to the rotating shaft 23 is taken out from the shaft end to be effectively used. Between each of the stator blades 24*a* and the rotating shaft 23, a leaf seal 25 is provided as a shaft seal mechanism for reducing leakage of the combustion gas leaking to a lower pressure side from a higher pressure side.

Figure 2:
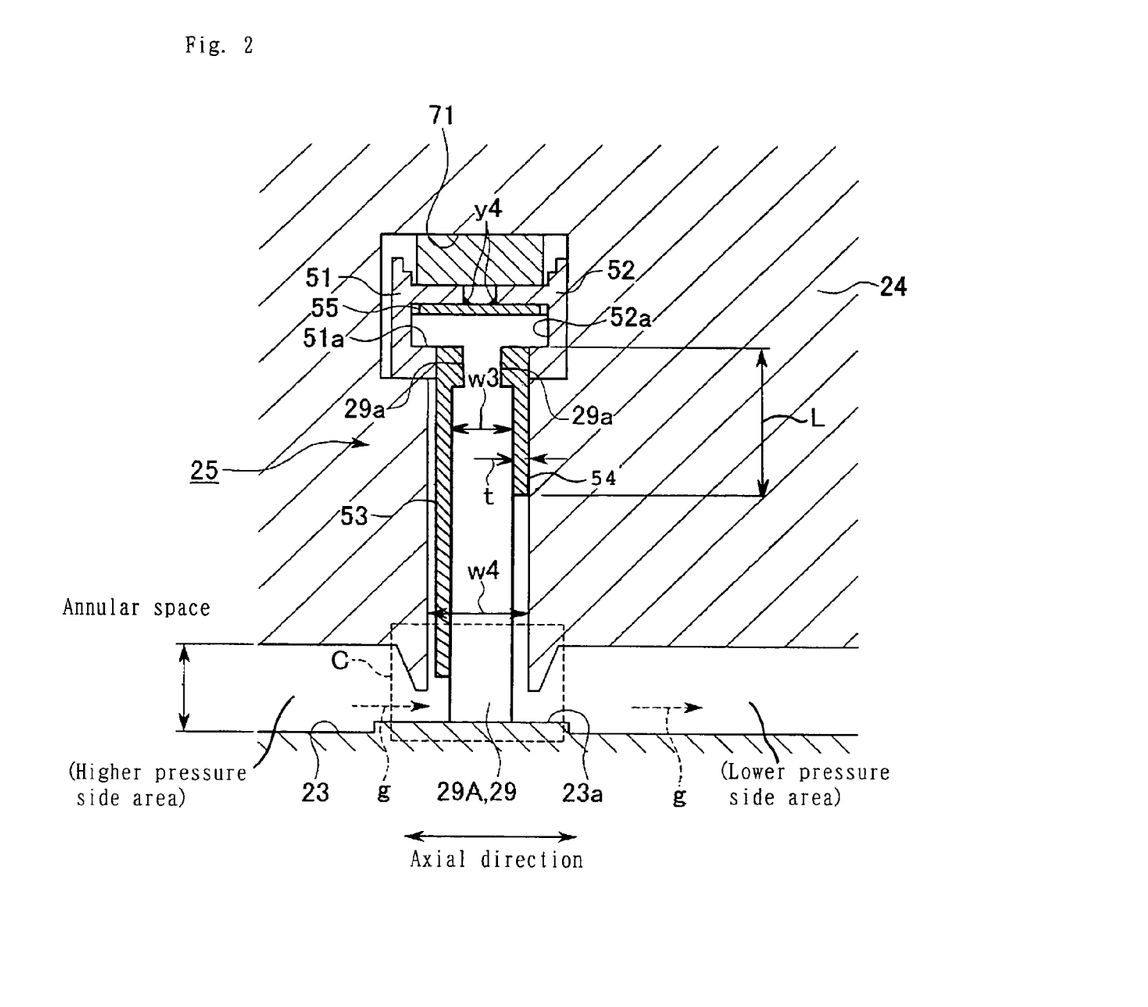
FIG. 2 is a cross sectional view showing a construction of the leaf seal assembled into a stator, wherein the leaf seal is seen on a cross section including an axis of a rotating shaft.

FIG. 2 is an enlarged cross sectional view of the leaf seal 25, wherein the leaf seal 25, after having been assembled into the stator 24, is seen on a cross section including an axis of the rotating shaft 23. Herebelow, description will be made first on a basic construction of the leaf seal 25 and then on a characteristic feature thereof.

As shown in FIG. 2, the leaf seal 25 is arranged to be positioned in an annular space between the rotating shaft 23 and the stator 24 and comprises a thin plate assembly 29A of an annular shape constructed by a plurality of thin plates 29 arranged in layers, wherein each of the thin plates 29 has its plate width direction arranged in parallel with the axial direction of the rotating shaft 23 and there is formed a minute gap between each of the thin plates 29 in a circumferential direction of the rotating shaft 23.

Each of the thin plates 29 has its outer circumferential proximal end side supported to the stator 24 and its inner circumferential distal end side arranged inclinedly with an acute angle relative to an outer circumferential surface 23*a* of the rotating shaft 23. By this construction, the annular thin plate assembly 29A comprising the thin plates 29 divides the annular space between the rotating shaft 23 and the stator 24 into a higher pressure side area and a lower pressure side area.

Next, the characteristic feature of the leaf seal 25 having the basic construction as mentioned above will be described with reference to FIG. 2.

As shown in FIG. 2, the leaf seal 25 of the present embodiment is constructed comprising the plurality of thin plates 29 arranged in layers in which each of the thin plates 29 is a plate approximately of T-shape having a plate width of the above-mentioned outer circumferential proximal end side formed larger than a plate width of the above-mentioned inner circumferential distal end side. The leaf seal 25 also comprises two leaf seal retainers 51, 52 (thin plate retaining rings) of a pair that retain and support the thin plates 29 in an annular state. A higher pressure side plate 53 of an annular shape is fitted in between one side edge, opposed to the higher pressure side area, of each of the thin plates 29 and one of the leaf seal retainers 51 so as to abut on this one side edge. A lower pressure side plate 54 of an annular shape is fitted in between the other side edge, opposed to the lower pressure side area, of each of the thin plates 29 and the other of the leaf seal retainers 52 so as to abut on this other side edge. A spacer 55 as a deviation preventing member is fitted in between the two leaf seal retainers 51, 52 so as to prevent a rattling movement of each of the thin plates 29 relative to the leaf seal retainers 51, 52.

Each of the thin plates 29 is a thin steel plate having flexibility, and approximately of T-shape, and has its both side edges formed with cut-off portions or recesses 29a. These thin plates 29 have their outer circumferential proximal end sides fixed to each other by welding (welded places will be described below with reference to FIG. 4) so as to form the thin plate assembly 29A having flexibility as a whole.

The higher pressure side plate 53 is an annular thin plate and, when seen on the cross section including the axis of the rotating shaft 23, has one side surface of its outer circumferential side portion formed with a stepped portion of which thickness is larger than a thickness of the inner circumferential side portion thereof. Likewise, the lower pressure side plate 54 is an annular thin plate and, when seen on the above-mentioned cross section, has one side surface of its outer circumferential side portion formed with a stepped portion of which thickness is larger than a thickness of the inner circumferential side portion thereof. The higher pressure side plate 53 and lower pressure side plate 54 have their respective stepped portions made engageable with the above-mentioned cut-off portions 29a of the thin plates 29 so as to make a close contact with both side surfaces of the thin plates 29 and then the so assembled members are pinched to be retained between the two leaf seal retainers 51, 52.

Each of the leaf seal retainers 51, 52 is a metal member having flexibility and, when seen on the cross section including the axis of the rotating shaft 23, has an approximate C-shape. Thus, the leaf seal retainers 51, 52, when jointed together, form concave portions 51a, 52a therein and the portion of which the width is enlarged of each of the thin plates 29 and the spacer 55 are fitted in the concave portions 51a, 52a.

Figure 3:
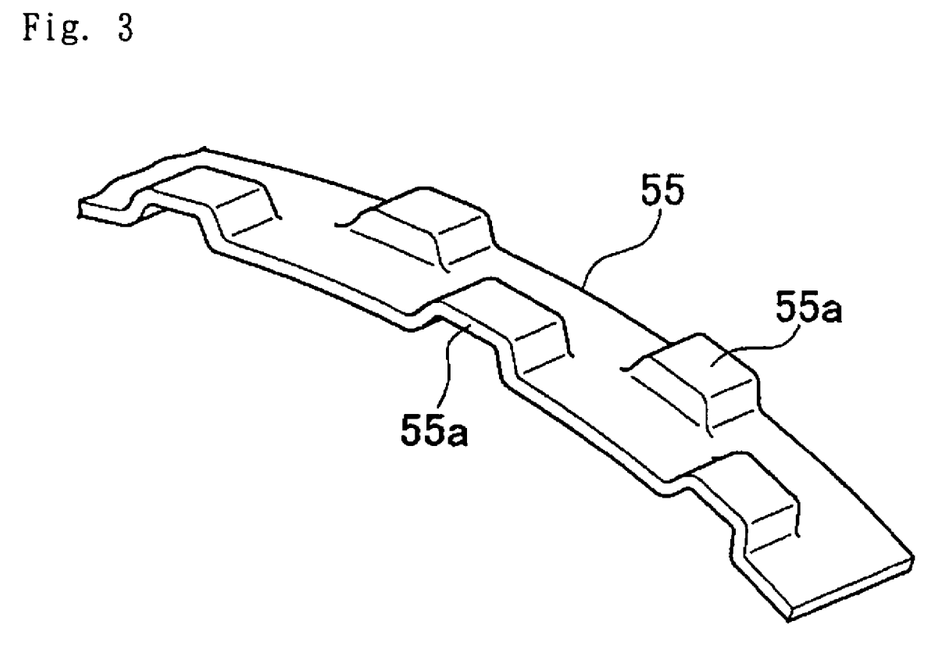
FIG. 3 is a perspective view of a spacer provided in the leaf seal.

As shown in FIG. 3, being a perspective view of the spacer 55, the spacer 55 is a plate spring, formed with a plurality of convex portions 55a, that, when pressed, elastically deform to thereby generate an activating force. As shown in FIG. 2, in order that no rattling of the annular thin plate assembly 29A is caused in the concave portions 51a, 52a, the activating force of the spacer 55 urges the annular thin plate assembly 29A on its outer circumferential side against the concave portions 51a, 52a. The spacer 55 at its upper surface and each of the leaf seal retainers 51, 52 are jointed together by welding as shown by welded places y4 and the relative position of these members is fixed.

Figure 4:
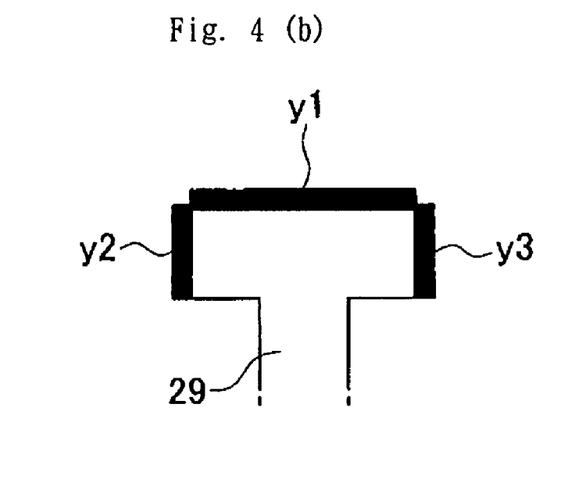
FIG. 4 are explanatory views of a manufacturing process of the leaf seal, wherein FIGS. 4(*a*) and 4(*b*) are views showing thin plates after a thin plate welding process and FIG. 4(*c*) is a view showing the thin plates after a bending process.

A manufacturing process of the leaf seal 25 constructed as mentioned above will be described next with reference to FIGS. 4 and 5. In the manufacture of the leaf seal 25, a thin plate welding process, bending process and ring fitting process are carried out.

Firstly, in the thin plate welding process, as shown in FIG. 4(a), each of the thin plates 29, made in the T-shape by punching of a steel plate, is lapped inclinedly one on another so as to form layers and then the mentioned outer circumferential proximal end side of the layers is welded. That is, as shown in FIG. 4(b), each of the thin plates 29 has an outer circumferential end and both side ends of its outer circumferential proximal end side welded so that the thin plates 29 are jointed together, as shown by welded places y1 to y3.

Then, in the bending process, the thin plates 29, so welded and jointed together, and the leaf seal retainers 51, 52 are roughly bent in pre-bending before the next ring fitting process. FIG. 4(c) shows the state of the thin plates 29 after the bending process.

Figure 5:
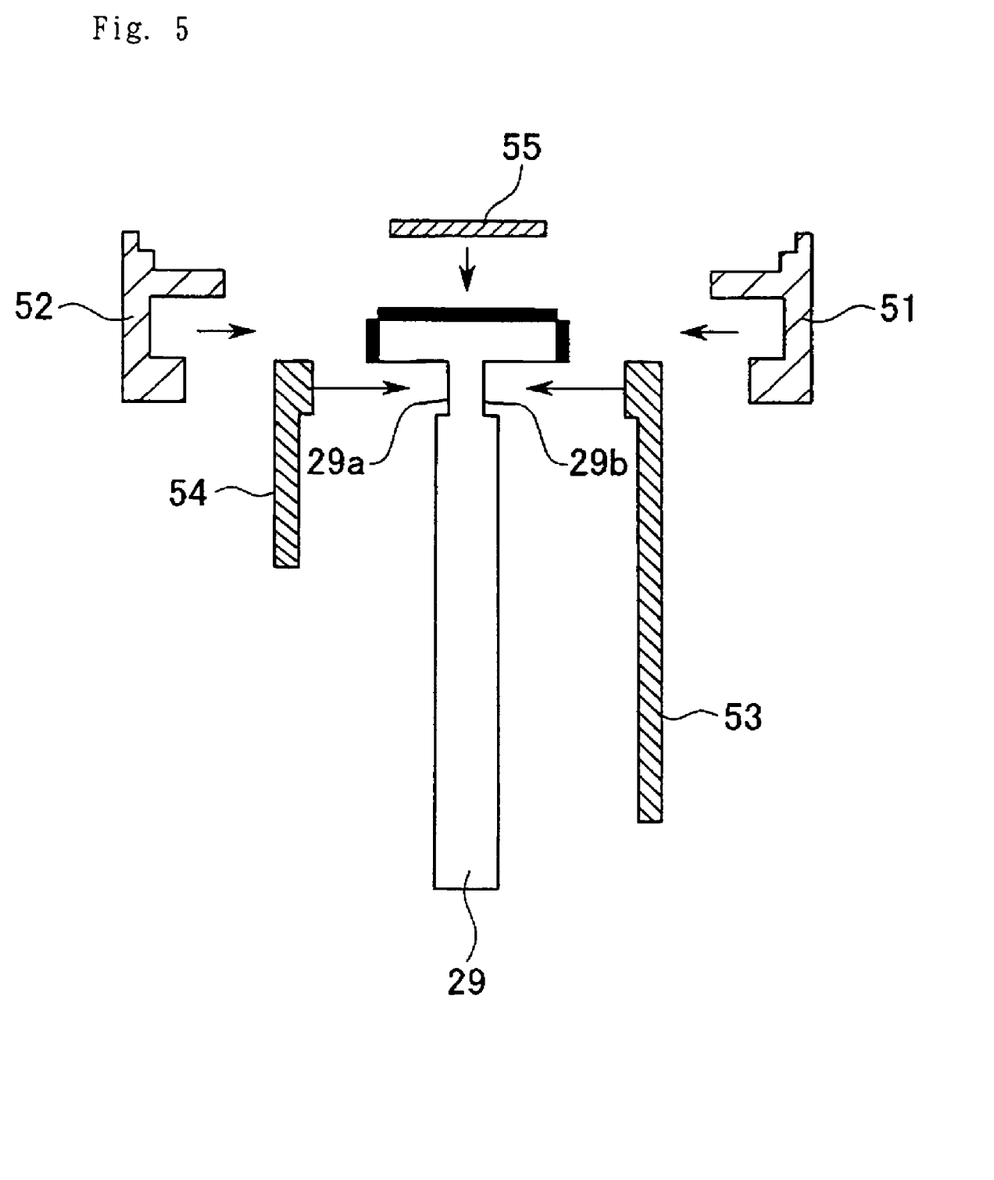
FIG. 5 is an explanatory view of a ring fitting process as a subsequent process of the manufacturing process of the leaf seal.

In the next ring fitting process, as shown in FIG. 5, the outer circumferential proximal end side of the welded thin plates 29, the higher pressure side plate 53, the lower pressure side plate 54 and the spacer 55 are fitted in between the leaf seal retainers 51, 52 and then the leaf seal retainers 51, 52 are fixed together.

That is, the annular higher pressure side plate 53 is first pinched to be retained between the one side edge, opposed to the higher pressure side area, of each of the thin plates 29 and the one leaf seal retainer 51 so as to abut on this one side edge. Likewise, the annular lower pressure side plate 54 is pinched to be retained between the other side edge, opposed to the lower pressure side area, of each of the thin plates 29 and the other leaf seal retainer 52 so as to abut on this other side edge. Then, the spacer 55 for regulating the motion of each of the thin plates 29 relative to the leaf seal retainers 51, 52 is fitted in to be retained between the outer circumferential proximal end side of the thin plates 29 and the leaf seal retainers 51, 52.

The leaf seal retainers 51, 52 so assembled together with the other members are welded to be fixed to the spacer 55 at the welded places y4 (FIG. 2).

Thus, fixing of the leaf seal retainers 51, 52 is carried out.

According to the construction and manufacturing process of the leaf seal 25 as mentioned above, even if the place or size of shaft diameter to which the leaf seal 25 is applied differs to some extent, no exclusive jig as in the conventional case is needed to be individually prepared and hence the manufacturing cost of the leaf seal 25 can be reduced. Also, the thickness of each of the leaf seal retainers 51, 52 can be thinned to the extent to exhibit the flexibility and hence the external size of the leaf seal retainers can be made smaller, and this contributes to making the entire leaf seal 25 compact.

It is to be noted that, when the assembled shaft seal member (the leaf seal 25) is to be fitted in the stator 24, the leaf seal 25 may be inserted into a concave groove 71 provided in an inner circumferential surface side of the stator 24 in the state that the leaf seal 25 is being bent along a curvature of the concave groove 71. In this method, the curvature of the leaf seal 25 can be freely changed according to the place where the leaf seal 25 is to be provided and hence no exclusive jig as in the conventional case is needed to be individually prepared. Thereby, the manufacturing cost of the leaf seal 25 can be reduced.

Also, in the ring fitting process of the manufacturing process of the leaf seal of the present embodiment, a method is employed such that the higher pressure side plate 53 is pinched to be retained between the one side edge of each of the thin plates 29 and the one leaf seal retainer (thin plate retaining ring) 51. According to this method, fitting of the higher pressure side plate 53 can be easily carried out and thereby a further reduction of the manufacturing cost becomes possible.

Also, in the ring fitting process of the manufacturing process of the leaf seal of the present embodiment, a method is employed such that the lower pressure side plate 54 is pinched to be fixed between the other side edge of each of the thin plates 29 and the other leaf seal retainer (thin plate retaining ring) 52. According to this method, fitting of the lower pressure side plate 54 can be easily carried out and thereby a further reduction of the manufacturing cost becomes possible.

What is claimed is:

1. A shaft seal mechanism forming a leaf seal in an annular space between a rotor and a stator, comprising:
   a plurality of thin plates lapped on one another in layers in a circumferential direction of the rotor and arranged in the annular space between the rotor and the stator so as to form a thin plate assembly of an annular shape; and
   a pair of thin plate retaining rings between which an outer circumferential proximal end side of each of said thin plates is pinched so as to be retained by said retaining rings,
   wherein said outer circumferential proximal end side of each of said thin plates is supported on a stator side and an inner circumferential distal end side of each of said thin plates is non-fixed to an outer circumferential surface of said rotor so that said thin plate assembly of annular shape divides the annular space into a higher pressure side area and a lower pressure side area;
   a deviation preventing member arranged between said outer circumferential proximal end side of said thin plates and said thin plate retaining rings so as to regulate motion of each of said thin plates relative to said thin plate retaining rings,
   wherein said pair of thin plate retaining rings each have an approximate C-shape as seen in a cross-section taken along an axis of rotation and together form concave portions in which said outer circumferential proximal end side of each of said thin plates and said deviation preventing member are fitted so that said thin plate assembly is pressed on its outer circumferential side;
   wherein said thin plate assembly has side edges on the higher pressure side and the lower pressure side respectively, said side edges being formed with respective annular recesses;
   side plates provided on the higher pressure side and lower pressure side, respectively, of said thin plate assembly, each of said side plates having a side surface formed with a stepped portion that is engaged with a respective one of said annular recesses on the higher pressure side and the lower pressure side;
   wherein said side plates on the higher pressure side and the lower pressure side abut said thin plate assembly in the axial direction of said rotor; and
   said thin plate assembly is pinched together with said side plates between said pair of thin plate retaining rings.

2. A shaft seal mechanism according to claim 1,
   wherein mutually adjacent ones of said outer circumferential proximal end sides of said thin plates of said thin plate assembly are welded to each other so as to be fixed to each other and said thin plate assembly of said thin plates so welded is bent along a circumferential plane of said annular space.

3. A shaft seal according to claim 1, wherein:
   each of said thin plates has a length with said outer circumferential proximal end side at one end and said inner circumferential distal end side at an opposite end, a width extending in an axial direction of said rotor, and a thickness, wherein each of said thin plates is wider than it is thick at said inner circumferential distal end side;
   wherein said plurality of thin plates are lapped in the circumferential direction of the rotor to form said thin plate assembly so that said thin plates overlap each other in their thickness direction.

4. The shaft seal mechanism of claim 1, wherein each of said thin plates has a length, width and thickness, wherein each said width extends in an axial direction of the rotor, and each said thickness extends in a direction in which said thin plates are lapped, said width being greater than said thickness.

5. The shaft seal mechanism of claim 1, wherein said deviation preventing member is elastically deformable to generate an activating force.

6. The shaft seal mechanism of claim 1, wherein said deviation preventing member comprises a spring urging said thin plates relative to said thin plate retaining rings such that rattling movement of said thin plates relative to said thin plate retaining rings is prevented.

7. A shaft seal mechanism forming a leaf seal in an annular space between a rotor and a stator, comprising:
   a plurality of thin plates lapped on one another in layers in a circumferential direction of the rotor and arranged in the annular space between the rotor and the stator so as to form a thin plate assembly of an annular shape; and
   a pair of thin plate retaining rings mounted with said stator between which an outer circumferential end of each of said thin plates is held so as to be retained by said retaining rings so that said outer circumferential end of each of said thin plates is supported on a stator side and an inner circumferential distal end side of each of said thin plates is non-fixed to an outer circumferential surface of said rotor and so that said thin plate assembly of annular shape divides the annular space into a higher pressure side area and a lower pressure side area;
   a deviation preventing member arranged between said outer circumferential end of said thin plates and said thin plate retaining rings;
   wherein said pair of thin plate retaining rings each have an approximate C-shape as seen in a cross-section taken along an axis of rotation and together form concave portions in which said outer circumferential end of each of said thin plates and said deviation preventing member are fitted so that said thin plate assembly is pressed on its outer circumferential side;
   wherein said thin plate assembly has thin plate assembly sides on the higher pressure side and the lower pressure side thereof, respectively, said thin plate assembly sides being formed with respective annular recesses;
   side plates provided on the higher pressure side and lower pressure side of said thin plate assembly, respectively, each of said side plates having a side surface formed with a stepped portion that is engaged with a respective one of said annular recesses on the higher pressure side and the lower pressure side;
   wherein said side plates on the higher pressure side and the lower pressure side abut said thin plate assembly in the axial direction of said rotor; and
   said side plates and said thin plate assembly is held by said pair of thin plate retaining rings.

* * * * *